United States Patent Office 3,403,915
Patented Oct. 1, 1968

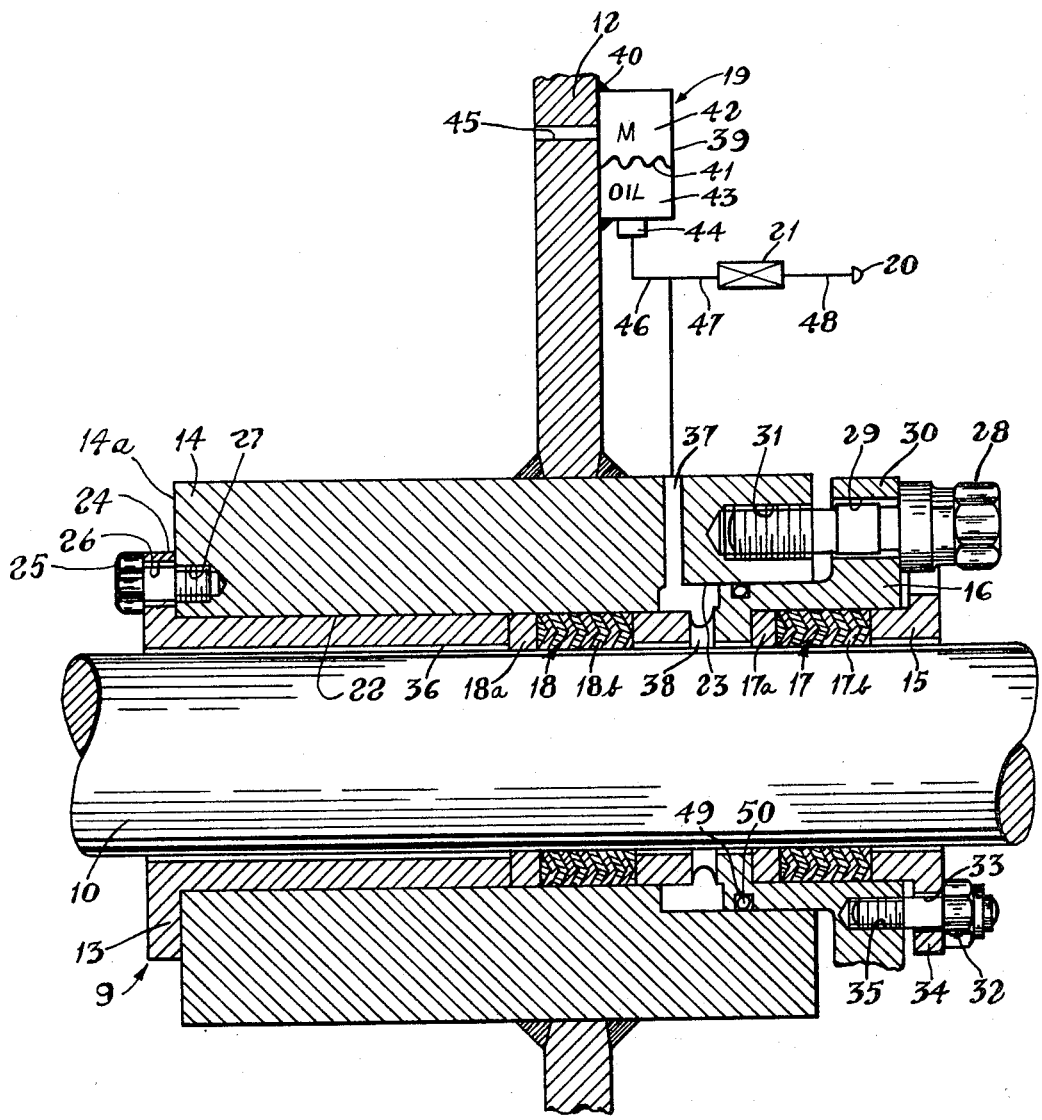

3,403,915
DIFFERENTIAL PRESSURE RESPONSIVE
SHAFT SEAL APPARATUS
Harrison W. Roberts, 4904 N. 16th Road,
Arlington, Va. 22207
Filed Jan. 18, 1966, Ser. No. 521,453
1 Claim. (Cl. 277—3)

ABSTRACT OF THE DISCLOSURE

A seal for the propeller shaft of a ship. A stuffing box, secured watertight to the hull of a ship at the opening in the hull through which the propeller shaft extends, supports two axially spaced apart seal members, each responsive to a difference in pressure axially thereacross to form a seal with the shaft that extends through the stuffing box and a fluid passage between the exterior of the stuffing box and the interior of the stuffing between the seals, and a fluid supply means coupled to the fluid passage and responsive to sea water pressure at the propeller end of the shaft for supplying fluid to the fluid passage at that pressure.

---

The invention described herein may be manufactured and used by or for the Government of the United States of America for governmental purposes without the payment of any royalties thereon or therefor.

This invention relates to an improved differential pressure responsive shaft seal for interrupting the flow of pressurized fluid along a shaft in the direction of a low pressure area.

The invention is particularly useful in the sealing of through hull fittings below the water line of ships, although not limited thereto, and will be described in relation to such application.

In many ship constructions the seals for some shafts, such as for propeller shafts, are located in a part of the ship where access to the seals is difficult in order to observe the start of leakage along the shaft. Hence, it is important that the life of such seals and their full effectiveness be prolonged as far as possible. It is also important, in the event of leakage, when a ship is at sea far from a service port, it is desirable that provision be made for elimination of such leakage. Of still further advantage would be provision for automatic elimination of the leakage with concurrent indication that leakage has occurred. In submarines the seal must be effective at different depths in the sea where the seawater pressure varies considerably.

Conventional seals have been developed with provisions for extending the life of the seal and, in the case of oil balanced seals, with provision for manually deactivating one of a pair of tandem arranged packings upon the observance of leakage.

The present invention has for a general object the provision of an improved seal for a fluid pressure differential exposed shaft.

A further object is to provide an improved seal of extended effective life.

Another object is to provide a seal in which correction for leakage is accomplished automatically while indication of the occurrence of leakage is manifest.

A still further object is to provide a seal having a primary seal packing normally activated and a secondary seal packing normally inactivated and subject to minimum wear.

Another object is to provide a seal having provision for shifting the burden of seal from primary to secondary packing upon the occurrence of leakage and provision for replacing the primary packing while the shaft remains sealed by the secondary packing.

Other objects and advantages will be apparent from the following description of an example of the invention, and the novel features will be particularly pointed out hereinafter in connection with the appended claims.

In the accompanying drawing:

The drawing shows a cross-sectional elevation and schematic diagram of apparatus representing one example of the invention.

Referring to the drawing, one embodiment of the improved fluid seal is shown in operative relationship with a ship propeller shaft 10 which projects through an aperture 11 in a hull wall 12 and is sealed therein by the improved seal indicated generally by numeral 9.

The seal apparatus comprises a stuffing box including a bearing collar 13, a hull-fitting 14, and primary and secondary packing glands 15 and 16, together with primary and secondary packings 17 and 18, a fluid pressure actuated accumulator 19, and means for recharging the accumulator as exemplified by oil recharging fitting 20 and recharge valve 21.

The hull-fitting 14 is secured to the hull wall 12 by welding or other suitable means and is apertured as at 22 and 23 to receive the bearing collar 13 and secondary packing gland 16. The collar 13 is flanged as at 24 and secured to the fitting 14 by a plurality of studs as, for example, stud 25 passing through an aperture 26 in the flange and threaded into a threaded hole 27 in outboard end 14a of the fitting 14. The secondary packing 18 is positioned on the shaft 10 in abutting relation to the free end of collar 13 and secured in position by the secondary packing gland 16 which is adjustably secured to the opposite, i.e., in board end, of the fitting 14 by a plurality of studs, one of which is shown at 28 passing through aperture 29 in a flanged portion 30 of the gland 16 and threaded into a threaded aperture 31 in the fitting 14. Primary packing gland 15 is formed to telescope into secondary packing gland 16 to engage primary packing 17. A plurality of studs, as for example, stud 32, are passed through apertures 33 in a flanged portion 34 of the gland 15 and threaded into a threaded hole 35 of the gland 16.

The internal diameter of the bearing collar 13, secondary packing gland 16 and primary packing gland 15 are such as to provide clearance, indicated at 36, between each of said elements and the periphery of shaft 10. The packings 18 and 17 each include spacer rings 18a and 17a and pluralities of V-packing rings 18b and 17b positioned with their expansion faces in the direction of the outboard end of shaft 10 to respond to fluid pressure differential thereacross in the direction of the low pressure inband end of the shaft 10 to independently effect a seal to the passage of fluid pressure along the shaft 10.

To alternately actuate the packings 18 and 17 for the seal of fluid pressure along shaft 10 passageways, as for example, radial passage 37 and annular passageway 38, are formed respectively in the fitting 14 and secondary packing gland 16 to pass to the portion of clearance 36 between the packings 18 and 17 and thence to adjacent surfaces of the packings a lubricant fluid under pressure corresponding substantially to the ambient fluid pressure outside said hull wall.

To supply lubricating fluid under pressure to the passageways 37 and 38 any suitable means, controlled to supply pressure corresponding to the pressurized fluid against which seal is required, is provided. In the preferred embodiment shown in the drawing, the fluid pressure responsive accumulator 19 is provided. Accumulator 19 comprises a housing 39 attached by welding as indicated at 40 or other suitable means to the wall 12, a diaphragm 41 defining chambers 42 and 43 and a fluid pressure responsive discharge valve 44. The wall 12 is apertured as at 45 to admit pressure fluid from outside the hull to the chamber 42. The valve 44 is a conventional fluid pressure responsive valve connected by conduit 46 to supply lubricant under pressure to passageway 37. The lubricant fluid recharge valve 21 and recharge fitting 20 are connected by lines 47 and 48 to recharge the accumulator with lubricant as required. Diaphragm 41 separates sea water medium in chamber 42 from lubricating fluid in chamber 43 and transmits the fluid pressure of the sea water to the lubricant fluid to equalize fluid pressure on the secondary packing. An annular groove 49 is formed in the perimeter of the secondary packing gland 16 to receive an O-ring 50 as a fluid seal means between fitting 14 and gland 16.

*Operation*

Following the assembly of the bearing collar 13, packing glands 15 and 16 and packing 17 and 18 on the shaft 10, lubricating fluid is passed to chamber 43 of the accumulator 19 through recharge fitting 20–21 and fluid pressure corresponding to the sea water fluid pressure in chamber 42 is passed through the medium of diaphragm 41 to the lubricating fluid.

Thus, fluid pressure on opposite sides of the secondary packing 18 are equalized. There is then no differential fluid pressure on packing 18 to forcefully urge the packing against the shaft 10 and hence there is little or no wear occurring on packing 18. However, the pressurized lubricant on the outboard side of primary packing 17 provides a fluid pressure differential in the direction of the inband end of shaft 10 across packing 18 causing the V-cross-sectional packing elements 17b to be forcefully urged against shaft 10 and develop a satisfactory seal preventing the leakage of lubricant fluid past the packing 17. Packing 17 thus becomes the working seal for normal operation. Sea water is prevented from leaking along shaft 10 by the equalizing lubricating oil pressure on secondary packing 18.

When the primary packing 17 eventually develops leakage through wear, such leakage will be detected by oil leakage in band on the shaft 10. At this occurrence the fluid lubricant pressure on packing 17 may be released by draining oil through the recharge fitting 20–21 whereupon fluid pressure differential is immediately established across secondary packing 18 and it takes over the burden of shaft seal. Pressure responsive valve 44 automatically closes responsive to loss of fluid pressure in line 46 and oil is retained in chamber 43. Gland 15 is then removed, packing 17 replaced, and the gland 15 reattached. Thereafter line 46 is recharged through recharge fitting 20–21 and the seal system is returned to its original condition, packing 17 being operative and packing 18 riding lightly on shaft 10.

In the event that the oil leakage is not detected, or the seal is in a location where surveillance is not feasible, the take over by secondary packing 18 becomes automatic when oil is exhausted from the accumulator 19 and thus fluid pressure in line 46 is lost.

Advantages of particular importance in the above-described apparatus is the fact that the primary packing can be replaced without drydocking the ship and the fact that substantial wear occurs on the replaceable primary packing, thus always maintaining a serviceable reserve, i.e., secondary, packing. Under such conditions there is no longer a need to consider seal life a factor in determining the service time of a ship between drydockings and there is no occasion when unanticipated seal failure will cause unscheduled drydocking or risk to the ship.

It will be understood that various changes in the details, materials and arrangements of parts, which have been herein described and illustrated in order to explain the nature of the invention, may be made by those skilled in the art within the principle and scope of the invention as expressed in the appended claim.

I claim:
1. In combination with a ship having a propeller shaft extending through an opening in the hull, an improved propeller shaft seal for preventing penetration of sea water into the ship along the propeller shaft and which permits seal repair afloat, said shaft seal comprising:
   a cylindrical hull fitting extending through and secured watertight in the opening in the hull and surrounding the propeller shaft where the propeller shaft penetrates the hull, the inboard end of the hull fitting being recessed to have an enlarged inside diameter,
   a collar secured in the outboard portion of the hull fitting,
   a first stacked circular V-shaped seal means located in the hull fitting around the shaft and oriented with the apex of the V-shape directed inboard,
   a primary packing gland and a secondary packing gland, both glands having inside diameter approximately equal to the inside diameter of the collar, the secondary packing gland being recessed longitudinally from one end whereby it has a larger inside diameter for part of its length, the primary packing gland being nested in the recess in the secondary packing gland,
   a second stacked circular V-shaped seal means substantially identical to the first V-shaped seal means located in the recess in the secondary packing gland, confined between the packing glands, and oriented with the apex of the V-shape directed toward the primary packing gland,
   the secondary packing gland being stepped from a smaller outside diameter at the end opposite the recessed end to an intermediate portion of larger outside diameter, to nest in the inboard end of the hull fitting,
   means detachably securing said secondary gland to the inboard end of the hull fitting when nested therein and adjustable to compress the first seal means,
   means detachably securing said primary packing gland to said secondary gland while nested therein and operable to compress the second seal means between the primary and secondary packing glands,
   the hull fitting and the secondary packing gland being apertured inboard of the hull with the apertures in both hull fitting and secondary gland providing a fluid path between the shaft and the exterior of hull fitting inboard of the hull, between the first and second seal means,
   said hull being apertured laterally of the hull fitting and below the water line,
   means inside the ship providing two fluid chambers sealed from one another by a flexible diaphragm with one of the chambers in fluid communication with the hull aperture,
   fluid conduit means coupling the other of the chambers to the aperture in the hull fitting, and
   means coupled to said fluid conduit means for use in charging the other chamber with oil.

References Cited

UNITED STATES PATENTS

| | | | |
|---|---|---|---|
| 731,228 | 1/1903 | Rush | 277—60 |
| 2,029,598 | 2/1936 | Timbs et al. | 277—69 X |
| 3,088,744 | 5/1963 | Ezekiel et al. | 277—3 |
| 3,176,996 | 4/1965 | Barnett | 277—2 |

SAMUEL ROTHBERG, *Primary Examiner.*